US006947061B2

(12) United States Patent
Van Epps

(10) Patent No.: US 6,947,061 B2
(45) Date of Patent: Sep. 20, 2005

(54) METHOD OF DISPLAYING AN IMAGE

(75) Inventor: Jeffrey J. Van Epps, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 422 days.

(21) Appl. No.: 10/260,100

(22) Filed: Sep. 30, 2002

(65) Prior Publication Data

US 2004/0070597 A1 Apr. 15, 2004

(51) Int. Cl.[7] .......................... G09G 5/02; H04N 5/222; G09K 9/32

(52) U.S. Cl. .................. 345/698; 348/333.11; 382/299

(58) Field of Search .......................... 345/3.3–3.4, 698; 382/299; 348/207.1–207.11, 208.13, 333.11

(56) References Cited

U.S. PATENT DOCUMENTS 5,164,831 A * 11/1992 Kuchta et al. ........... 348/231.7
6,041,143 A * 3/2000 Chui et al. .................. 382/232
6,154,755 A * 11/2000 Dellert et al. ............... 715/526
6,195,462 B1 * 2/2001 Bryniarski et al. ......... 382/239
6,278,447 B1 * 8/2001 Anderson .................... 715/723
6,747,648 B2 * 6/2004 Hoehn et al. ............... 345/428

* cited by examiner

*Primary Examiner*—Xiao Wu
*Assistant Examiner*—M. Fatahiyar
(74) *Attorney, Agent, or Firm*—David A. Norvais

(57) ABSTRACT

A method of displaying a digital image. The method comprises the steps of: accessing a digital file comprising the digital image, the digital file including at least a first and second format, each of the at least first and second formats having digital data representing the digital image; providing at least one criterion; displaying the digital image employing the digital data of the first format if the first format fulfills the at least one criterion; and displaying the digital image employing the digital data of another format if the first format does not fulfill the at least one criterion.

10 Claims, 3 Drawing Sheets

METHOD OF DISPLAYING AN IMAGE

FIELD OF THE INVENTION

The invention relates generally to the field of digital imaging, and in particular to displaying a digital image.

BACKGROUND OF THE INVENTION

As is well known, a digital image can be stored as a digital image file on a digital storage device, such as a hard drive, floppy disk, memory card, CD, or the like. A high quality digital image is comprised of many pixels (i.e., a high resolution image), and therefore, when stored on a digital storage device, the digital image file can be quite large and take significant amounts of time to process. Accordingly, it is common to provide a reduced resolution image. This reduced resolution image is commonly referred to as a "thumbnail" or a "thumbnail image". Often, the thumbnail is created as part of the image acquisition process (for example, using a digital camera) or in close timing thereto. Further, the thumbnail is typically stored in a reserved area associated with each image file. If stored in this manner, the thumbnail image follows the high resolution image wherever the image file travels. The thumbnail image can be easily and quickly accessed, thereby allowing fast review and display of the thumbnail image. This low-resolution "thumbnail" size image can be created as described in commonly-assigned U.S. Pat. No. 5,164,831 (Kuchta), the disclosure of which is herein incorporated by reference.

Because the thumbnail is of a reduced resolution, the image quality can be unacceptable for viewing purposes. Accordingly, a need exists for a method to determine when a thumbnail is of sufficient resolution to be acceptable for viewing by a user.

SUMMARY OF THE INVENTION

An object of the present invention is to provide a method to determine when a thumbnail has sufficient resolution to be acceptable for viewing or display.

This object is given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to the invention, there is provide a method of determining whether to select only a reduced resolution version of a digital image or alternatively to select only a higher resolution version of the digital image, depending upon the image quality of the reduced version. The method comprises:

automatically providing at least one criterion relating to an acceptable image quality; and selecting only the reduced resolution version of the digital image whenever the reduced version fulfills the at least one criterion, or alternatively selecting only the higher resolution version of the digital image whenever the reduced resolution version does not fulfill the at least one criterion, so that only one of the reduced and higher resolution versions of the digital image can be selected.

More particularly, there is provided a method of determining whether to allow to be viewed only a reduced resolution version of a digital image or alternatively to allow to be viewed only a higher resolution version of the digital image, depending upon the image quality of the reduced version. The method comprises:

automatically providing at least one criterion relating to an acceptable image quality; and allowing to be viewed the reduced resolution version of the digital image whenever the reduced version fulfills the at least one criterion, and not allowing to be viewed the reduced resolution version of the digital image whenever the reduced version does not fulfill the at least one criterion, but then allowing to be viewed only the higher resolution version of the digital image, so that only one of the reduced and higher resolution versions of the digital image can ever be viewed.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
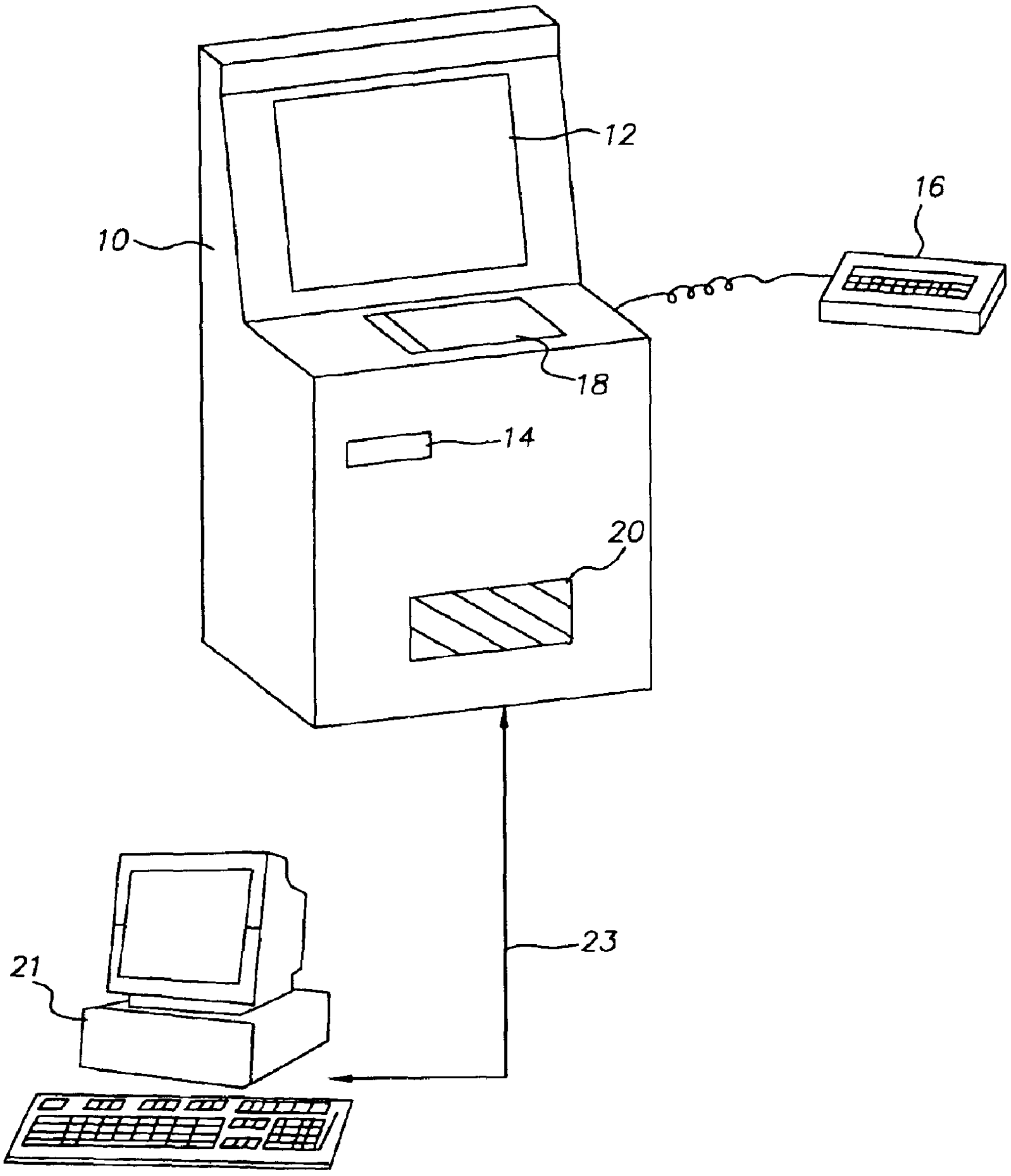
FIG. 1 shows a display device of a kiosk.

The following is a detailed description of the preferred embodiments of the invention, reference being made to the drawings in which the same reference numerals identify the same elements of structure in each of the several figures.

The present invention is directed to a method of displaying a digital image on a display device. The display device can be any device having a display adapted to display a digital image, for example, a computer, a digital camera, a video camera, a kiosk, a camcorder, a cellular phone having a display, and the like. FIG. 1 shows display device 10 configured as a kiosk, for example a Picture Maker™ kiosk produced by Eastman Kodak Company. Display device 10 is generally illustrated in FIG. 1 and includes a display 12 for displaying a digital image and an input port 14 adapted to receive a digital storage device such as a memory card, memory stick, media card, compact flash card, floppy disk, compact disc, PictureCD, or the like as known to those skilled in the art. Display 12 can be a touchscreen display, whereby a user can provide information and data to image producing device 10, or a keyboard 16 may be used to provide information and data. Display device 10 can optionally include a scanner 18 for receiving a user-supplied visual image and converting the visual image into digital form stored in a digital file. Display device 10 further shows an optional delivery section 20 controlling the delivery of a medium. Delivery section 20 is illustrated in FIG. 1 as an opening in display device 10. A digital file comprising a digital image can be transmitted to/from display device 10 from/to another display device, a server, digital minilab, wholesale lab, remote computer or other digital device 21 over a communication network 23.

Figure 2:
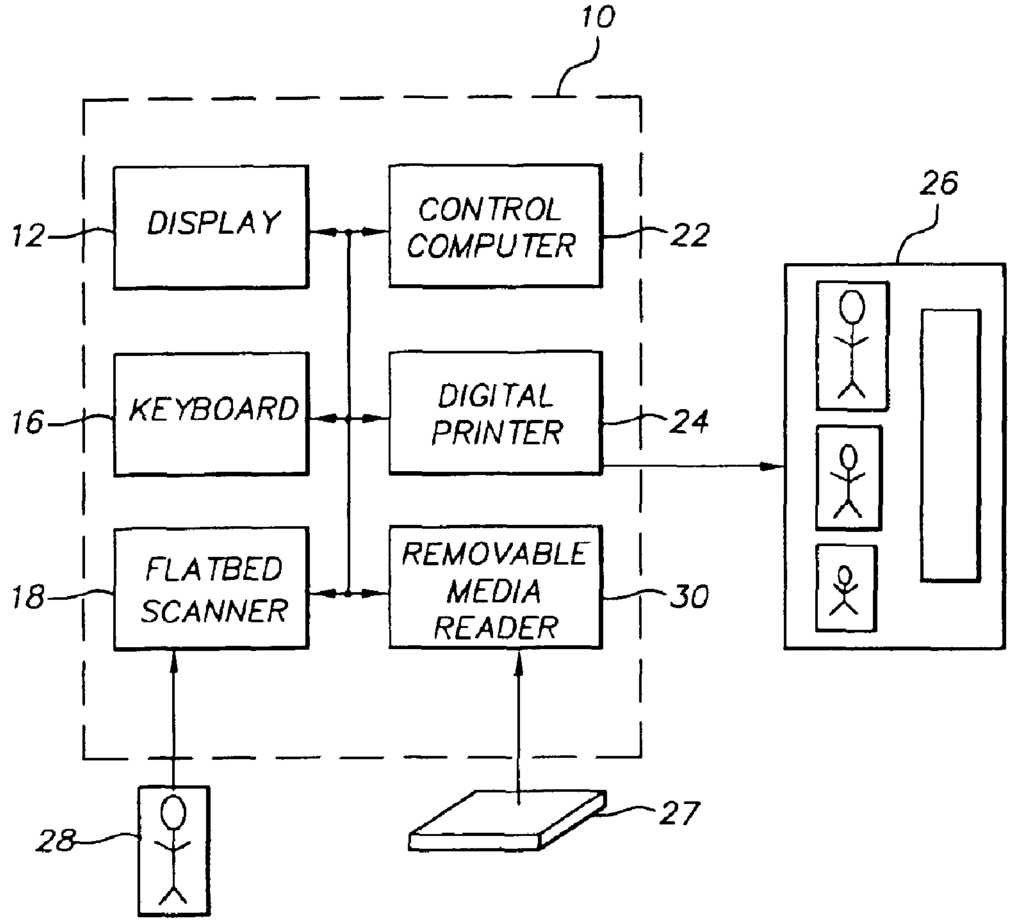
FIG. 2 shows a diagram of included functions of the display device of FIG. 1

FIG. 2 generally shows a diagram of included functions of display device 10. As illustrated, display device 10 can include keyboard 16 and scanner 18. A computer 22 typically manages the flow of information and functionality of the components of display device 10. Internal to display device 10 can be a printer 24, an example of which is the Kodak Digital Science Model 8650 manufactured by Eastman Kodak Company. Printer 24 responds to commands of computer 22 for forming an image on a medium such as thermal or ink-jet paper. An example of an output image is illustrated in FIG. 2 at 26 formed from an input image 28. One method of receiving a digital image is illustrated by a removable media reader 30 disposed internal to input port 14 for receiving removable media 27, for example, a memory card, floppy disk, compact disc, PictureCD, or other form of removable media used in transferring digital files.

The Picture Maker kiosk produced by Kodak allows a user to manipulate the digital image displayed on display 12. For example, a user can rotate the digital image, zoom and crop the digital image, and correct artifacts present in the digital image (for example, red eye). Hardcopy prints of the digital image can be ordered using the Picture Maker kiosk. Accordingly, when display device 10 is being used for such applications, it is desirable for the digital image displayed on display 12 to be of an acceptable image quality.

When a user desires to view a digital image on display 12 of display device, the digital file comprising the digital image is accessed. As disclosed above, it is common for a single digital file to comprise both a thumbnail image and a high resolution image of the digital image. Accordingly, computer 22 needs to determine whether to access the thumbnail image or high resolution image for display on display 12.

As discussed above, because the thumbnail is of a reduced resolution, the image quality of the thumbnail can be of an unacceptable image quality for viewing and/or for manipulating. This situation can occur if the digital image is displayed in a large size. Displaying the digital image in a large size may be desirable if display 12 is of a large size. For example, if a user is determining whether to order a hardcopy print of the displayed digital image, the user needs to view an image of acceptable image quality in order to access the image to determine if it is worthwhile to pay for a hardcopy print.

To ensure that a image quality of the displayed digital image is acceptable, the high resolution image can be consistently accessed and displayed. However, as disclosed above, the high resolution image of the digital image file can be quite large and take significant amounts of time to process. Accordingly, a need exists for a method of determining when to display the thumbnail such that the thumbnail comprises an acceptable quality image so that the high resolution image need not be accessed. Applicant has determined a method wherein a criterion is employed to determine when to display the thumbnail.

Figure 3:
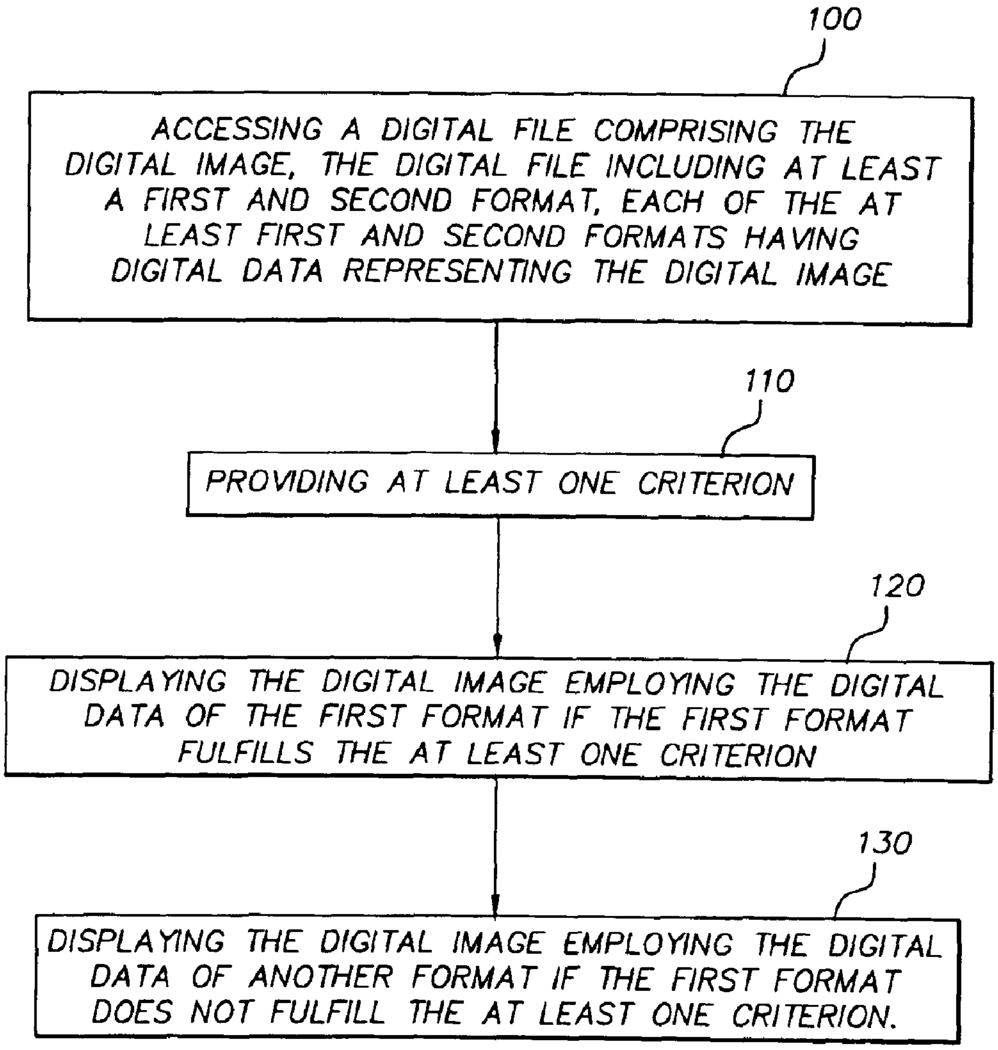
FIG. 3 shows a flow diagram of a method in accordance with the present invention.

FIG. 3 provides a flow diagram of the method in accordance with the present invention. The method is directed to displaying a digital image. At step 100, a digital file is accessed. The digital file comprises the digital image, the digital file including at least a first and second format, each of the at least first and second formats having digital data representing the digital image. For example, as disclosed above, the first and second format can be a high resolution format and a reduced resolution format. Other formats may be known to those skilled in the art, such as 4 base or 16 base. A criterion is then provided at step 120. This step will be discussed in more detail below. The digital image is then displayed employing the digital data of the first format if the first format fulfills the at least one criterion (step 130). The digital image is displayed employing the digital data of another format if the first format does not fulfill the at least one criterion (step 140).

One criterion employed by Applicant is referred to as "MinPixels", referring to a threshold or "minimum pixels". That is, a predetermined number of pixels is determined.

Stated alternatively, the digital image must comprise a predetermined number of pixels. For example, the first format is the reduced resolution format, i.e., the thumbnail. If the thumbnail is comprised of at least this predetermined number of pixels in at least one dimensions (i.e., in the width and/or height), the digital data of the thumbnail is employed. If the first format does not fulfill this predetermined number of pixels, the digital data of the other format (for this example, the high resolution image) is employed. As such, the criterion comprises a minimum number of pixels in a horizontal orientation. Another criterion comprises a minimum number of pixels in a vertical orientation of the digital image. Yet another criterion comprises a minimum number of pixels in both the horizontal and vertical orientation of the digital image. In a preferred embodiment, the predetermined number (i.e., the minimum number) is 120 pixels in each dimension (i.e., 120 in width and 120 in height). Applicant has determined that this criterion is effective in determining which thumbnails provide an unacceptable image quality.

If the thumbnail is determined to fulfill the criterion, the thumbnail is transferred into memory and used as the source. If it does not fulfill the criterion, the high resolution image is used as the source.

If the first criterion is not satisfied, and the digital data of the other format is employed, the other format can be queried to determine if it (i.e., the other format) fulfills the criterion. If it does not fulfill the criterion (yet is being employed to display the digital image), a warning message or other indicator can be provided/displayed to warn the user that an image of unacceptable quality is being displayed. The warning message can be visual, audible, and/or both.

In another embodiment, if it is determined that neither format fulfills the criterion, computer 22 can determine which of the two formats more closely fulfills the criterion, and employ the digital data of that criterion. That is, of the two formats, which provides a better quality image.

Multiple conditioned criterion can be employed. For example, a particular format must satisfy a plurality of criterion to be employed.

It is recognized that the method of the present invention can be employed with images which are not digital still images. For example, the method of the present invention can be directed to video stream.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10 display device
12 display

14 input port
16 keyboard
18 scanner
20 delivery section
21 computer
22 computer
23 communication network
24 printer
26 output image
27 removable media
28 input image
30 removable media reader

What is claimed is:

1. A method of determining whether to select only a reduced resolution version of a digital image or alternatively to select only a higher resolution version of the digital image, depending upon an image quality of the reduced version, said method comprising:

automatically providing at least one criterion relating to an acceptable image quality; and selecting only the reduced resolution version of the digital image whenever the reduced version fulfills the at least one criterion, or alternatively selecting only the higher resolution version of the digital image whenever the reduced resolution version does not fulfill the at least one criterion, so that only one of the reduced and higher resolution versions of the digital image can be selected.

2. The method as recited in claim 1, wherein the criterion is a predetermined number of pixels so that only the reduced resolution version is selected whenever it has at least the predetermined number of pixels and the reduced resolution version is not selected whenever it has less than the predetermined number of pixels.

3. The method as recited in claim 1, wherein the criterion is a predetermined number of pixels in only one dimension of the digital image so that only the reduced resolution version is selected whenever it has at least the predetermined number of pixels in the one dimension and the reduced resolution version is not selected whenever it has less than the predetermined number of pixels in the one dimension.

4. The method of claim 3, wherein the one dimension of the digital image is a width dimension of the digital image.

5. The method of claim 3, wherein the one dimension of the digital image is a height dimension of the digital image.

6. The method of claim 4, wherein an image quality warning indication is provided whenever only the higher resolution version is selected and the higher resolution version does not have at least the predetermined number of pixels.

7. The method of claim 4, wherein the higher resolution version is queried whenever only the higher resolution version is selected, in order to determine whether the higher resolution version fulfills the predetermined criterion, and an image quality warning indication is provided should the higher resolution version not fulfill the predetermined criterion.

8. The method as recited in claim 1, wherein the criterion is a sufficient number of pixels necessary to obtain the acceptable image quality so that only the reduced resolution version is selected whenever it has at least the predetermined number of pixels and only the higher resolution version is selected whenever the reduced resolution version has less than the predetermined number of pixels and even though the higher resolution version does not have at least the predetermined number of pixels.

9. The method of claim 1, further comprising:

displaying only the reduced resolution version whenever it is selected; and displaying only the higher resolution version whenever it is selected.

10. A method of determining whether to allow to be viewed only a reduced resolution version of a digital image or alternatively to allow to be viewed only a higher resolution version of the digital image, depending upon an image quality of the reduced version, said method comprising:

automatically providing at least one criterion relating to an acceptable image quality; and allowing to be viewed the reduced resolution version of the digital image whenever the reduced version fulfills the at least one criterion, and not allowing to be viewed the reduced resolution version of the digital image whenever the reduced version does not fulfill the at least one criterion, but then allowing to be viewed only the higher resolution version of the digital image, so that only one of the reduced and higher resolution versions of the digital image can ever be viewed.

* * * * *